United States Patent
Barton

(10) Patent No.: US 7,020,328 B2
(45) Date of Patent: Mar. 28, 2006

(54) ELECTRONIC COLOR DROPOUT UTILIZING SPATIAL CONTEXT TO ENHANCE ACCURACY

(75) Inventor: Mark A. Barton, Virginia Beach, VA (US)

(73) Assignee: Eastman Kodak Company, Rochester, NY (US)

( * ) Notice: Subject to any disclaimer, the term of this patent is extended or adjusted under 35 U.S.C. 154(b) by 609 days.

(21) Appl. No.: 10/235,015

(22) Filed: Sep. 4, 2002

(65) Prior Publication Data

US 2004/0042657 A1    Mar. 4, 2004

(51) Int. Cl.
*G06K 9/00* (2006.01)
(52) U.S. Cl. ...................... 382/163; 382/172
(58) Field of Classification Search ........... 382/112, 382/190, 162–165, 167–168, 209, 172–173, 382/218, 254, 266, 284; 358/504, 505, 515, 358/518, 522, 524, 530
See application file for complete search history.

(56) References Cited

U.S. PATENT DOCUMENTS

| 5,014,328 | A | | 5/1991 | Rudak ................... 382/163 |
| 5,014,329 | A | | 5/1991 | Rudak ................... 382/163 |
| 5,841,899 | A | * | 11/1998 | Ide et al. ................ 382/168 |
| 6,035,058 | A | * | 3/2000 | Savakis et al. ......... 382/163 |
| 6,111,984 | A | * | 8/2000 | Fukasawa .............. 382/209 |
| 6,343,146 | B1 | * | 1/2002 | Tsuruoka et al. ...... 382/163 |
| 6,473,522 | B1 | * | 10/2002 | Lienhart et al. ........ 382/168 |
| 6,757,426 | B1 | * | 6/2004 | Link et al. .............. 382/163 |
| 6,792,133 | B1 | * | 9/2004 | Ott et al. ................ 382/112 |
| 6,823,081 | B1 | * | 11/2004 | Lee et al. ............... 382/163 |
| 6,950,553 | B1 | * | 9/2005 | Deere .................... 382/218 |
| 2004/0042657 | A1 | * | 3/2004 | Barton .................... 382/173 |

* cited by examiner

*Primary Examiner*—Andrew W. Johns
*Assistant Examiner*—Amir Alavi
(74) *Attorney, Agent, or Firm*—Nelson Adrian Blish

(57) ABSTRACT

A method for electronic color dropout utilizing spatial context to enhance accuracy comprises scanning a document to produce a color digital image. A thresholding apparatus is applied to the color digital image to produce a bitonal image. A region of the color digital image is selected corresponding to a feature of the bitonal image. An average color for the region is computed and compared to a predetermined dropout color. If the average color matches the predetermined dropout color, the region is erased from the bitonal image. Once it is determined that all features of the bitonal image have been examined, the process is complete. If all the features of the bitonal image have not been examined a region of the color digital image is selected corresponding to a feature of the bitonal image.

10 Claims, 3 Drawing Sheets

FIG. 3

ELECTRONIC COLOR DROPOUT UTILIZING SPATIAL CONTEXT TO ENHANCE ACCURACY

FIELD OF THE INVENTION

This invention relates in general to document scanners and in particular to electronic image processing algorithms used in document scanner and other office imaging equipment.

BACKGROUND OF THE INVENTION

Electronic color dropout is a process wherein the colored regions of a scanned document, which correspond to the original data entry forms lines and background areas, are "dropped" from the image. When used with an original data entry form that contains colored field dividing lines, and colored field name text, this type of processing effectively removes all the redundant image content from the form, and leaves only the data that has been entered over it. In other words, it renders the form areas of the processed image invisible, leaving only the text which appears in the original. Performing this step makes subsequent optical character recognition algorithms more effective, it reduces image storage space required, and improves retrieval efficiency, by removing unnecessary image content.

Current technology performs this task by examining each pixel of the input image, one at a time. Each pixel is compared to one or more dropout colors and a decision is made to either drop the pixel, process the pixel in some special way, or leave it unmodified. Some methods apply the values of the digitized color signal to a look up table, and determine what to do with the pixel based on the contents of the look up table. This is still essentially examining a single pixel color, however, the decision on color dropout has been predetermined and tabulated instead of being determined 'on the fly.'

To better understand how the disclosed invention improves on the state of the art, the problems that have been observed with the existing techniques must be examined. Typically, a dropout algorithm will take a full color, digital input image, and convert it to grayscale. During this process, it will map most pixels to the directly corresponding normal grayscale value, but some pixels will be deemed 'dropout' pixels due to their color, and will be mapped to a background color instead of their normal grayscale. Then, the grayscale image is passed through an adaptive thresholding process (ATP) which converts the grayscale image to a bitonal image. The desired effect is that the resultant bitonal image will be black. In particular, the bitonal image will be white in the regions that were 'dropped out.' The problems with this technique are:

When the color being dropped is detected, the dropout process generally substitutes a background color, or grayscale level. But the actual background may be dark, and mottled, not solid white. Therefore, what color should be substituted? Substituting the wrong, or a flat background that does not match the local background of the image can create edges in the output which trigger subsequent adaptive thresholding process (ATP). This can make bitonal blotches in the final output where there are none in the original.

With a faded form, some of the colored areas that should be dropped are not the same shade as the core color of lines on the form. Some pixels in a nominally 'red' area may actually be no redder than the text, and further the luminance of some pixels is actually darker than the text. These pixels either do not dropout, or if the dropout tolerance is set high enough to drop them, the text will have voids in it.

The fuzzy edges on form lines can fail to dropout, because the color is not as vivid as the rest of the form. In extreme cases, this can cause the lines to double when the center or core of a line drops out and the edges do not, leaving a double line.

With individual pixel processing, inconsistencies in the coloration of form areas can cause parts of the form to be retained, i.e., not dropout. If the tolerance is set too high on the dropout color (seeking to ensure complete dropout of form areas), then parts of actual desired text may be dropped undesirably. Further, substitution of an incorrect background color for the dropout regions can introduce steps in the color of the background area, causing ATP to produce unwanted artifacts in the output.

SUMMARY OF THE INVENTION

It is an object of the present invention to improve on color dropout by considering the surrounding pixels, not just individual pixels, as electronic images are processed.

Briefly, in one aspect of the present invention a method for electronic color dropout utilizing spatial context to enhance accuracy comprises scanning a document to produce a color digital image. A thresholding apparatus is applied to the color digital image to produce a bitonal image. A region of the color digital image is selected corresponding to a feature of the bitonal image. An average color for the region is computed and compared to a predetermined dropout color. If the average color matches the predetermined dropout color, the region is erased from the bitonal image. Once it is determined that all features of the bitonal image have been examined, the process is complete. If all the features of the bitonal image have not been examined, the next region of the color digital image is selected corresponding to a feature of the bitonal image.

Color dropout utilizing spatial context increases complexity of the system, with an attendant cost impact on equipment, however, it can dramatically improve on several serious performance problems that occur with the single pixel processing algorithms.

By considering neighboring pixels and how they are geometrically connected to the pixel being evaluated currently, the disclosed algorithms can determine an average color for the whole feature (or near part of the feature) in the original document, of which the current pixel forms a part. This average color better represents the overall color of the feature taken as a whole, and is more likely to be correctly judged as a dropout color, or non-dropout color. In the disclosed algorithms, the color of the pixel being evaluated is blended with the color of other nearby pixels which are connected to it in the bitonal image. The blended color represents an average color of the connected pixels.

The connectivity of black pixels in a bitonal version of the image determines what makes up a "feature." Since the pixels that make up a character are connected (adjacent), they will be considered collectively by these algorithms, rather than individually. Similarly, the pixels that make up a form line, box, or background area are all connected, so they too will be considered collectively rather than individually. This serves to average out the inconsistencies that occur in color near feature edges, and across a page. By averaging out the variations in color and making dropout decisions based on a features average color, rather than individual pixel colors, the algorithms more accurately determine whether features are to be dropped out, or retained in the output image.

BRIEF DESCRIPTION OF THE DRAWINGS

FIG. 3 is a schematic showing a small region of pixels, that is processed by a windowed region algorithm for locating regions in the original image which correspond to color features that should be dropped out.

DETAILED DESCRIPTION OF THE INVENTION

An electronic scanning system capable of capturing an image in color produces a color digital original image. The digital original image is comprised of various parts and features, including colored data entry form lines, colored form text, user entered text, and color shaded areas.

Figure 1:
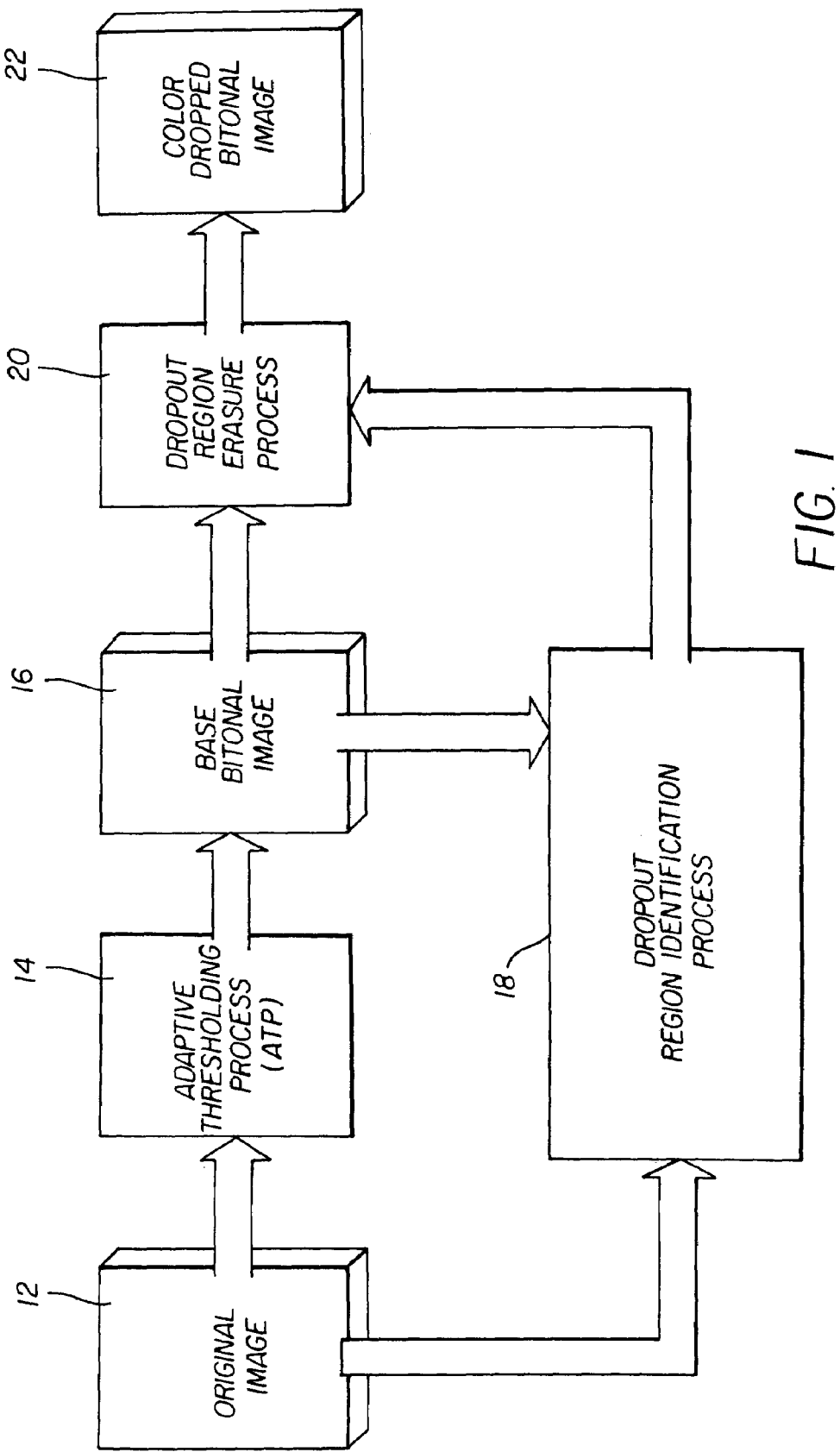
FIG. 1 is a flow diagram for a generalized electronic color dropout process which identifies and erases features based on a bitonal version of the original image.

After capture, image processing electronics or software performs the sequence of operations illustrated in FIG. 1, beginning with the digital original image 12. A preliminary color space transformation may be necessary to represent the image in a luminance chrominance form. The luminance channel of the original image is processed with an adaptive thresholding process (ATP) algorithm 14 to obtain a base bitonal image 16. Dropout regions which represent color features of the data entry form represented in the original image are found by a dropout region identification process 18. The pixel coordinates of all the points in these regions are passed to a dropout region erasure process 20 which changes the corresponding pixels in the base bitonal image from black to white, thereby producing the color dropped bitonal image 22 which is the final output of the system.

Color dropout is performed by changing black pixels in the base bitonal image to white, after ATP has already been performed, not by substituting a background color prior to ATP. This modification of the sequence of ATP and color dropout eliminates the potential for artifacts introduced by substituting the wrong background level.

First Method for Dropout Pixel Identification

Figure 2:
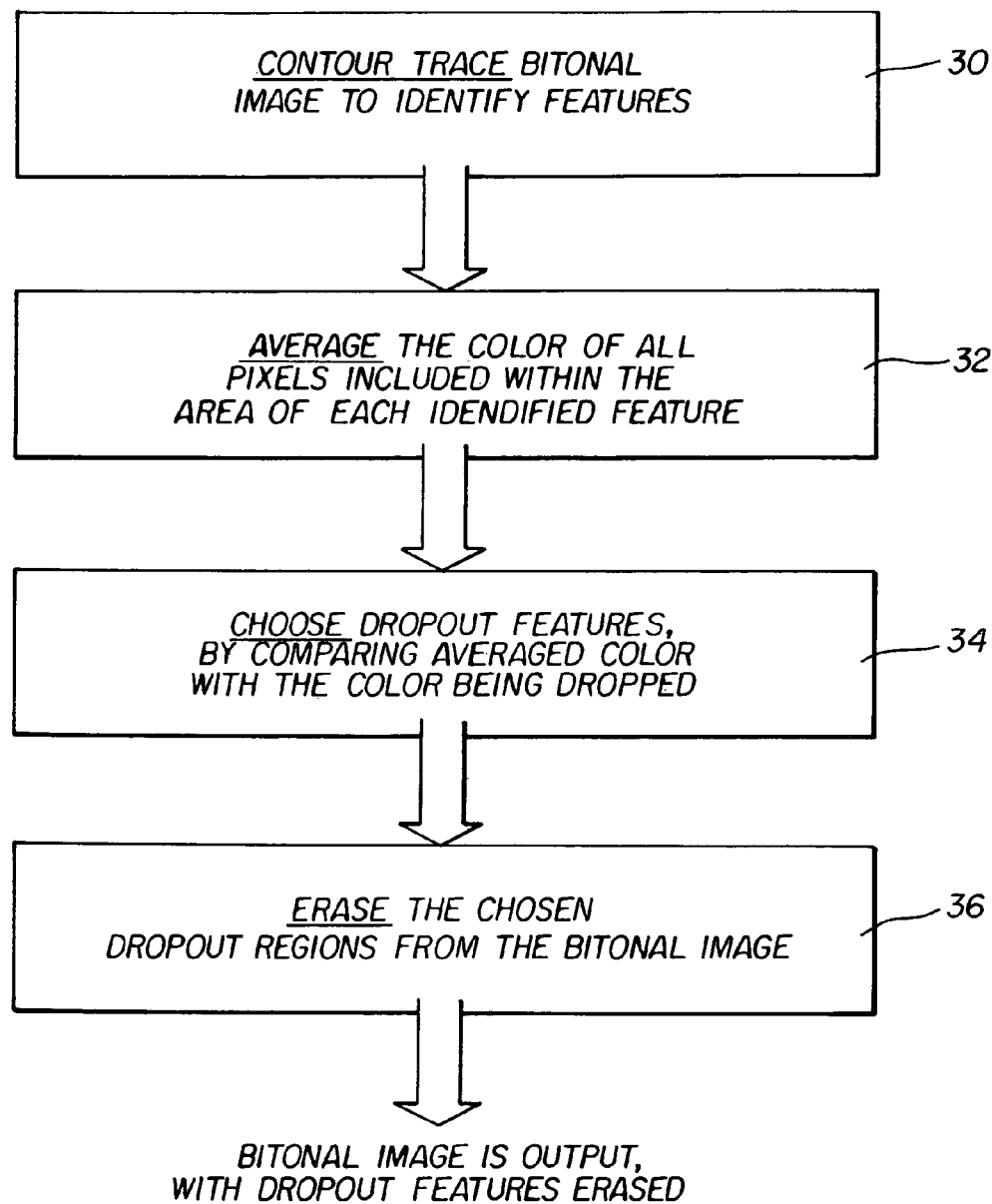
FIG. 2 is a flow diagram for a contour tracing algorithm for locating regions in the original image which correspond to color features that should be dropped out.

FIG. 2 illustrates the processing flow of the first method for identifying the dropout regions. A contour tracing algorithm 30 is applied to the base bitonal image. Contour tracing is the process of building a set of data structures, which represent the locations of connected (adjacent) black pixels in the image. The data structures group the pixels as sets of pixels that belong to the same feature. When each pixel is examined, its location is compared with the location of the pixels that make up each feature already identified. When a feature is found that contains a pixel which is adjacent to the current pixel, the current pixel is considered connected to it, and part of the feature. The connected pixel is added to the existing feature, and processing continues with the next pixel in the image. When a pixel is found that does not belong to any already identified features, it is considered the beginning of a new feature, and a new data structure is created to follow the new feature.

A complete contour tracing algorithm will normally include a feature merging capability. This capability handles features that contain V-like shapes. A V-shape results in two contours being started at the top of the V, and then subsequent discovery that they must be merged together into a single contour at the bottom. For the purpose of color dropout, it turns out to be better to not implement this functionality. The role of features in color dropout is to average color over a features area, not to necessarily perfectly identify the whole feature. Characters in a scanned document that fall on top of a form line would be merged together with the form line if a feature merge were included. For color dropout, its clearly better to not merge the characters (non-dropout features) with the form line (dropout feature). Further, it has also been found that some performance gain can be achieved by limiting the physical dimensions, or extent of contour size allowed. This can be done by breaking up the contours at a limiting size, or by only averaging color over the near part of contours in the subsequent color dropout stage.

When the contour tracing is complete, pixels at the coordinates that make up each feature identified by contour tracing of the base bitonal image, are examined in the original color image. The color in the original color image is averaged over the extent of each feature identified by contour tracing 32, and the resulting average is assigned as the color of the whole feature. Then, each features average color is compared to a dropout color to judge whether the entire feature should be dropped out 34. If the average color of the feature is sufficiently close to the intended dropout color (and this comparison may take several forms) then the coordinates that make up the whole feature are erased, or converted from black to white, in the bitonal image 36. This is repeated for every feature in the image, and the resultant bitonal image is the finished output of the algorithm. It is essentially the base bitonal image, with all the color dropout areas erased. These areas arose from regions in the original that have an average color sufficiently close to the dropout color.

As a further enhancement of the algorithm, the color averaging can be performed at each pixel within a feature, rather than once for the whole feature, and a weighting (or selection process) applied based on the distance from the pixel coordinates being evaluated. This serves to limit the averaging to pixels physically close to the location being evaluated.

Second Method for Dropout Pixel Identification

Figure 3:
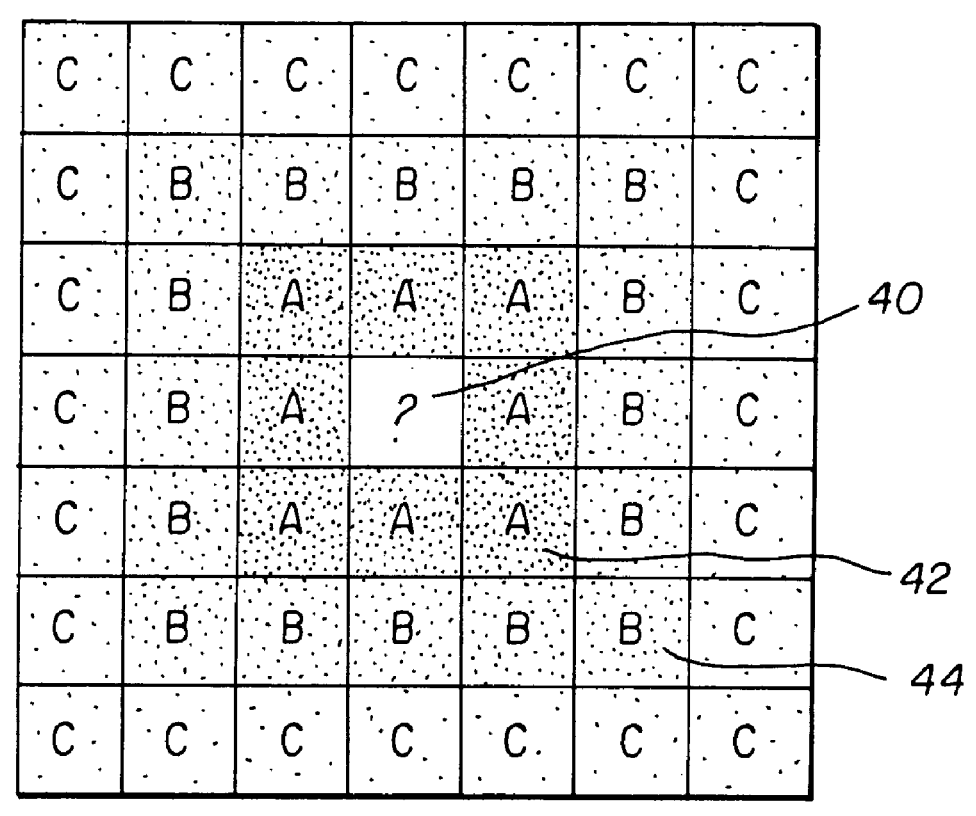

In the second disclosed method of dropout pixel identification, an evaluation window, illustrated in FIG. 3, is translated over the base bitonal image. As each set of pixel coordinates, the central pixel of the evaluation window is judged to be either a dropout pixel or not. This judgement is based only on the pixels within the evaluation window. Consequently, the spatial context that is utilized in this method is limited in size by the size of the window. The evaluation window can be any size deemed suitable to the scanner resolution and other characteristics, but has been found to work well on existing sample images, with a size of 7×7 pixels.

The central pixel 40 in the evaluation window is tested to determine if it is black. If it is not, no further operation is performed. If the central pixel is black, then it may potentially need to be dropped, (erased, or switched to white). The criterion for dropping the central pixel seeks to average the color in the color image, over the area defined by the black pixels in the bitonal image that are connected to the central pixel. To locate the connected pixels, the algorithm considers each pixel adjacent to (neighboring) the central pixel.

These pixels are designated group A 42 in FIG. 3. At each neighboring pixel that is black in the bitonal image, the color from the corresponding coordinates in the original color image are added to an accumulator of the average color. This sequence is repeated, recursively, at each neighboring black pixel. During this step, pixels in the group designated B 44 in the figure are considered, thereby propagating the area of consideration outward toward the edge of the evaluation window. So, evaluation begins at the center of the evaluation window, and the sequence is repeated proceeding outward from center until either the edge of the evaluation window is reached, or no connected black pixels are found in the bitonal image. When the sequence is complete for the entire evaluation window, the average color accumulator value is divided by the number of pixels which were added to develop the average color of all the connected pixels within the evaluation window.

The result of averaging the color of the original image over the connected black pixels in the bitonal image within the evaluation window, is then compared to the dropout color. If the averaged color is sufficiently close to the intended dropout color (and this comparison may take several forms) then the central pixel of the evaluation window is converted from black to white in the output bitonal image.

When this process has been performed on every pixel in the image, the output of the algorithm is the resultant bitonal image, developed from the original image processed by ATP, with all the dropout areas turned white (erased). Again, the dropout areas are those pixels found to be connected black regions in the bitonal image that have an average localized color (in the color image) sufficiently close to the dropout color.

Comparing a Color to the Dropout Color

All color dropout algorithms share the need to compare a color with an intended dropout color. The intended dropout color is the color in the original image of features that should not appear in the finished output. In the case of a data entry form, the intended dropout color is the color of the form lines, and background. The comparison can take various forms, including but not limited to:

The color channels are individually compared, and the root mean square (RMS) difference compared to a threshold value.

The color channels are individually compared and the largest difference compared to a threshold value.

The color channels are individually compared and the difference in each channel compared to a different threshold value. The individual channel comparisons are then logically combined to form the final result.

The color channels are converted to a luminance chrominance color space, and then two thresholds utilized for distance along the luminance axis and radius from it.

A look up table is utilized, which tabulates dropout based on the color channels input values. This method implements any function including, but not limited to, the ones above.

The invention has been described in detail with particular reference to certain preferred embodiments thereof, but it will be understood that variations and modifications can be effected within the scope of the invention.

Parts List

12 Original image
14 Adaptive thresholding process (ATP) algorithm
16 Base bitonal image
18 Dropout region identification process
20 Dropout region erasure process
22 Color dropout bitonal image
30 Contour tracing algorithm
32 Contour tracing average
34 Choose dropout feature
36 Erase dropout region
40 Central pixel
42 Designated group A
44 Designated group B

What is claimed is:

1. A method for electronic color dropout utilizing spatial context to enhance accuracy comprising:
   a) scanning a document to produce a color digital image;
   b) applying a thresholding process to said color digital image to produce a bitonal image;
   c) select a region of said color digital image corresponding to a feature of said bitonal image;
   d) compute an average color for said region;
   e) compared said average color of said region to one or more predetermined dropout colors;
   f) if said average color matches any of said predetermined dropout colors, erase said region from said bitonal image;
   g) determine if all features of said bitonal image have been examined; and
   h) if all features of said bitonal image have not been examined go to step c) if all features have been examined, the process is complete.

2. A method for electronic color dropout as in claim 1 wherein said thresholding process is an adaptive thresholding process.

3. A method for electronic color dropout as in claim 1 wherein said matching of said average color and said predetermined dropout color is within a predetermined tolerance.

4. A method for electronic color dropout utilizing spatial context to enhance accuracy comprising:
   a) scanning a document to produce a color digital image;
   b) applying a thresholding process to said color digital image to produce a bitonal image;
   c) utilizing a contour following algorithm applied to said bitonal image to select a region of said color digital image corresponding to a feature of said bitonal image;
   d) compute an average color for said region;
   e) compare said average color of said region to one or more predetermined dropout colors;
   f) if said average color matches any of said predetermined dropout colors, erase said region from said bitonal image;
   g) determine if all regions of said bitonal image have been examined; and
   h) if all features of said bitonal image have not been examined go to step c) and if all regions have been examined, the process is complete.

5. A method for electronic color dropout as in claim 4 wherein said thresholding process is an adaptive thresholding process.

6. A method for electronic color dropout as in claim 4 wherein said matching of said average color and said predetermined dropout color is within a predetermined tolerance.

7. A method for electronic color dropout utilizing spatial context to enhance accuracy comprising:
   a) scanning a document to produce a color digital image;

b) applying a thresholding process to said color digital image to produce a bitonal image;
c) establishing an evaluation window surrounding a pixel of said bitonal image;
d) locating the connected pixels within said evaluation window of said bitonal image, to select a region of said color digital image, corresponding to the connected pixels of said bitonal image;
e) compute an average color for said region;
f) compared said average color of said region to one or more predetermined dropout colors;
g) if said average color matches any of said predetermined dropout colors, erase said region from said bitonal image; and
h) repeat steps c) through f), for each pixel in said color digital image.

8. A method for electronic color dropout as in claim 7 wherein said thresholding process is an adaptive thresholding process.

9. A method for electronic color dropout as in claim 7 wherein said matching of said average color and said predetermined dropout color is within a predetermined tolerance.

10. A method for electronic color dropout as in claim 7 said computation of an average color for said region is accomplished on a pixel by pixel basis.

* * * * *